United States Patent
Holland et al.

(10) Patent No.: US 10,374,924 B1
(45) Date of Patent: Aug. 6, 2019

(54) VIRTUALIZED NETWORK DEVICE FAILURE DETECTION

(71) Applicant: Amazon Technologies, Inc., Seattle, WA (US)

(72) Inventors: Ryan Christopher Holland, Seattle, WA (US); Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 531 days.

(21) Appl. No.: 14/562,537

(22) Filed: Dec. 5, 2014

(51) Int. Cl.
*H04L 12/26* (2006.01)
*H04L 12/24* (2006.01)

(52) U.S. Cl.
CPC ...... *H04L 43/0823* (2013.01); *H04L 41/0654* (2013.01)

(58) Field of Classification Search
CPC ......... H04L 43/16; H04L 43/04; H04L 43/08; H04L 43/0805; H04L 12/1863; H04L 43/0823; H04L 41/0654; G06F 9/45558; G06F 2009/45591; G06F 9/45533; G06F 2009/4557; G06F 9/485
See application file for complete search history.

(56) References Cited

U.S. PATENT DOCUMENTS

| | | | |
|---|---|---|---|
| 8,332,688 B1 * | 12/2012 | Tompkins | G06F 11/1438 714/13 |
| 8,831,202 B1 * | 9/2014 | Abidogun | H04L 45/28 379/221.03 |
| 2006/0281451 A1 * | 12/2006 | Zur | H04W 4/001 455/422.1 |
| 2008/0011569 A1 * | 1/2008 | Hillier | G06Q 10/06 191/12.2 R |
| 2010/0046377 A1 * | 2/2010 | Ryan | H04L 41/0681 370/241 |
| 2010/0306764 A1 * | 12/2010 | Khanna | G06F 11/1482 718/1 |
| 2012/0131180 A1 * | 5/2012 | Nomura | G06F 9/5077 709/224 |
| 2013/0097601 A1 * | 4/2013 | Podvratnik | G06F 9/5027 718/1 |

(Continued)

*Primary Examiner* — Tonia L Dollinger
*Assistant Examiner* — Kristoffer L S Sayoc
(74) *Attorney, Agent, or Firm* — Thorpe North & Western, LLP

(57) ABSTRACT

A technology is described for detecting a failure of a primary virtualized device and failing over to a secondary virtualized network device. An example method may include generating a statistical model using historical data for network traffic that has been handled by a primary virtualized device. The statistical model may contain a functional state baseline representing a functional state of the primary virtualized device handling network traffic during a time frame. Having generated the statistical model, the functional state of the primary virtualized device may be monitored by calculating a network traffic metric for current network traffic handled by the primary virtualized device and comparing the network traffic metric for current network traffic handled by the primary virtualized device with a data point in the statistical model corresponding to the network traffic metric and the time frame for the network traffic metric.

19 Claims, 9 Drawing Sheets

(56) References Cited

U.S. PATENT DOCUMENTS

| | | | |
|---|---|---|---|
| 2013/0159487 A1* | 6/2013 | Patel | H04L 67/1031 709/223 |
| 2013/0275808 A1* | 10/2013 | McNeeney | G06F 11/1482 714/20 |
| 2014/0119174 A1* | 5/2014 | Bakhshi | H04L 69/18 370/221 |

* cited by examiner

VIRTUALIZED NETWORK DEVICE FAILURE DETECTION

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to host multiple computing instances using a hypervisor. Each computing instance may be a guest machine acting as a distinct logical computing system on the physical computing machine (i.e., a physical host). Computing instances may be logically grouped into private groups where the computing instances communicate with each other and with external computing systems via a network that includes virtualized network devices.

A virtualized device may be software executed by a virtual machine (e.g., a computing instance) that performs the functions of a physical computing device. For example, a virtualized network device may perform the function of a physical network device, such as a network gateway, router, switch, firewall, NAT (Network Address Translation) device, etc. Virtualized network devices may lack some of the layer 2 (data link layer) capabilities specified in the OSI (Open Systems Interconnection) model for computer networks, making the detection of a functional state for an individual virtualized network device problematic as compared to methods that may be used to detect the failure of a physical network device.

DETAILED DESCRIPTION

Figure 1:
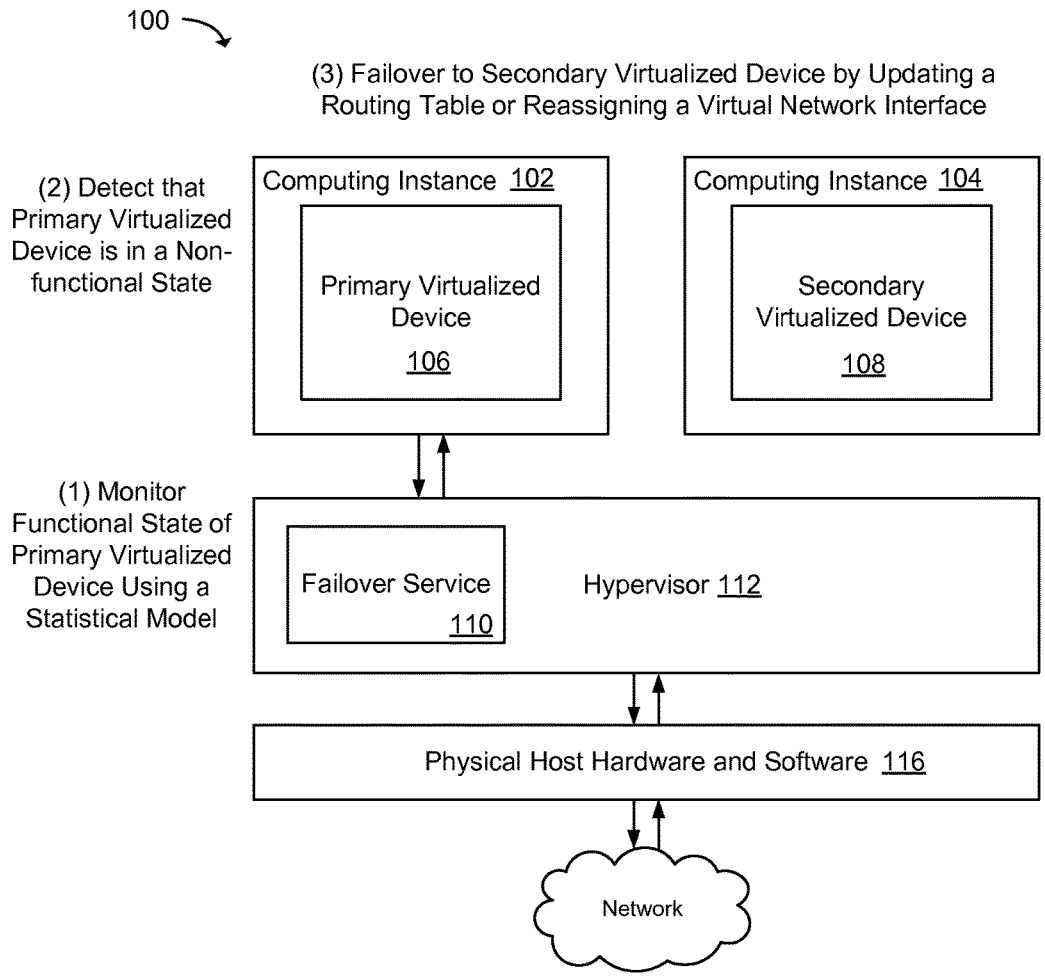
FIG. 1 is a block diagram illustrating an example system for monitoring the functional state of a primary virtualized device and failing over to a secondary virtualized device after detecting a failure of the primary virtualized network device.

A technology is described for detecting a failure of a primary virtualized device by comparing current network traffic metrics for the primary virtualized device to a statistical model representing a functional state of the primary virtualized device and then failing over to a secondary virtualized network device after detecting the failure of the primary virtualized device. A virtualized device may be any type of hardware and software that may be virtualized (e.g., executed on a virtual machine within a physical host). Illustratively, a virtualized device may include, but is not limited to, a web server, a data store server, a network switch, router, network adapter, firewall, load balancer, NAT (Network Address Translation) device, gateway, IDS (Intrusion Detection System), network attack mitigation device, or other type of virtualized device.

In one example configuration, a statistical model for network traffic (e.g., TCP (Transmission Control Protocol) network traffic or UDP (User Datagram Protocol) network traffic) that has been handled by a primary virtualized device may be generated using historical data associated with past network traffic handled by the primary virtualized device. The statistical model may represent a functional state of the primary virtualized device handling the network traffic during a particular time frame. For example, the statistical model may include a functional state baseline representing a functional state of the primary virtualized device handling network traffic. The tolerance of the functional state baseline may be increased by calculating a deviation from the functional state baseline and adding the deviation to the functional state baseline. As a result, a margin or a range may be added to the functional state baseline that accounts for variations in network traffic that may not indicate that a primary virtualized device is in a non-functional state.

The functional state of the primary virtualized device may be monitored within a hypervisor or a physical host by comparing current network traffic metrics (i.e., metrics for network traffic currently being handled by the primary virtualized device) with a statistical model corresponding to the time frame of the current network traffic metrics. In one example, current network traffic metrics may be calculated for network traffic being handled by the primary virtualized device. The current network traffic metrics may then be compared to data points in the statistical model that correspond to the time frame (e.g., a similar time of day, same day of the week or month, same holiday, etc.) of the current network traffic metrics. In the event that the current network traffic metrics correspond to data points that fall outside of a functional state baseline, then the primary virtualized device may be in a non-functional state and a failover to a secondary virtualized device may be performed by updating an internal routing table on the hypervisor or physical host to point to the secondary virtualized device or by reassigning a virtual network interface to the secondary virtualized device.

Virtualized networks may lack some capabilities included in physical networks that may be used to detect a failure of a physical network device, such as HSRP (Hot Standby Router Protocol) or GARP (Gratuitous Resolution Protocol) that may generally rely on network reachability to determine if a physical network device is functioning. These types of methods may not work within a virtualized network. For example, although a primary virtualized device may be reachable, the primary virtualized device may not be performing correctly. Further, after determining that a primary virtualized device may be in a non-functional state, failing over to a secondary virtualized device may involve making API (Application Programming Interface) calls to services that can take several minutes to perform a failover to a secondary virtualized device. As a result of the technology disclosed herein, current network traffic metrics for a primary virtualized device may be compared to a statistical model representing a functional state of the primary virtualized device to determine whether the primary virtualized device may be in a non-functional state. In the event that a failure of the primary virtualized device is detected, changes to an internal routing table or a reassignment of a virtual network interface may be performed without having to make API calls, thereby reducing an amount of time to perform a failover to a secondary virtualized device that may be as low as seconds or fractions of a second.

FIG. 1 is a block diagram illustrating a high level example of a system and method 100 that may be used to monitor the functional state of a primary virtualized device 106, and failover to a secondary virtualized device 108 after detecting a failure of the primary virtualized device 106. The secondary virtualized device 108 may be located on a physical host that hosts both the primary virtualized device 106 and the secondary virtualized device 108, or the secondary virtualized device 108 may be located on a different physical host (and different hypervisor) than the physical host that hosts the primary virtualized device 106. As illustrated, the system may include a hypervisor 112 that may be supported by physical host hardware and software 116. The hypervisor 112 may be software that manages the creation and execution of computing instances 102 and 104 on a physical host (i.e., a server computer). Alternatively, the hypervisor 112 may be hardware or firmware executed on a physical host 116.

Included in the hypervisor 112 may be a failover service 110 that may be configured to monitor the functional state of a primary virtualized device 106 executing on a computing instance 102. The failover service 110 may monitor the functional state of the primary virtualized device 106 by analyzing network traffic transmitted through a network layer of the hypervisor 112. As such, monitoring the functional state of the primary virtualized device 106 comprises collecting network traffic information associated with the state of the network traffic (e.g., the TCP state) handled by the primary virtualized device 106 and does not comprise obtaining state information for the primary virtualized device 106 from other sources, including from the primary virtualized device 106 itself. Namely, the primary virtualized device 106 is not queried for information about the state of the primary virtualized device 106. Instead, the functional state of the primary virtualized device 106 may be determined by analyzing external network traffic that is sent to the primary virtualized device 106 and external network traffic that is sent from the primary virtualized device 106.

Because monitoring of the primary virtualized device 106 and failover actions may be performed at the hypervisor 112 level allowing for access to internal routing tables and/or virtual network interfaces, failover to a secondary virtualized device 108 may be performed within a time frame that allows network connections handled by the primary virtualized device 106 to remain active and therefore, are not dropped as a result of a network state table timing out.

In one example configuration, current network traffic associated with the virtualized device 106 may be identified (e.g., by inspecting network packets) and network traffic metrics may be generated as the network traffic is transmitted through the hypervisor 112. Various network traffic metrics may be used to monitor the functional state of a primary virtualized device 106 by comparing the network traffic metrics with corresponding statistical models. For example, network traffic metrics for various TCP session states may be compared with statistical models representing the various TCP session states for a time frame corresponding to the TCP session states.

As current network traffic metrics are generated, the failover service 110 may be configured to compare the network traffic metrics with statistical models associated with the network traffic metrics. A statistical model may represent a functional state of the primary virtualized device 106, where a functional state may be an amount of network traffic that may be typically handled by the primary virtualized device 106 during a particular time frame. For example, during time frame T, a primary virtualized device may typically handle X number of established network connections. Handling of the X number of established network connections may represent a functional state of the primary virtualized device during time frame T.

Historical network traffic data for the primary virtualized device 106 may be used to construct a statistical model. In one example, a statistical model may be generated for each network traffic metric generated. For instance, network traffic metrics may be generated for various network session states (e.g., TCP session states) and a statistical model may be constructed for each network traffic metric generated. A statistical model may include a functional state baseline representing a functional state of a primary virtualized device 106. The functional state baseline may be an average, median, mean or another function calculated for the network traffic handled by a primary virtualized device 106 for a time frame. For example, an average, median or mean may be calculated for a number of established network connections, network connection requests, half-open network connections, etc. handled by the primary virtualized device 106 during a time of day (e.g., morning, afternoon, evening, etc.), week (e.g., Monday, Tuesday, weekday, weekend), month, year (e.g., summer, winter, etc.) and/or event.

In one example configuration, a variance or a deviation (e.g., a standard deviation) may be calculated and applied (e.g., added) to the functional state baseline. As a result, a tolerance of the functional state baseline may be increased (e.g., a margin of tolerance may be increased or a range may be established) and may result in fewer false positives when determining whether the primary virtualized device 106 may be in a non-functional state. As a specific example, a functional state baseline for a statistical model may show that at time T, a primary virtualized device 106 may handle an average of X established network connections. As such, the tolerance of the functional state baseline may be zero, resulting in a determination that the primary virtualized device 106 may be in a non-functional state when a network traffic metric corresponding to the functional state baseline is not equal to X. Therefore, a variance or a deviation may be added to the functional state baseline that increases the tolerance of the functional state baseline. Namely, adding a variance or deviation to the functional state baseline may expand a functional state definition to included values for network traffic metrics that are not equal to X, but fall within a range calculated for X. Alternatively, a hand curated range or value window centered around an average value may be provided to make the comparison of metrics more robust.

In one example, the variance or deviation added to the functional state baseline may be increased or decreased according to various parameters. For example, a variance may be increased or decreased according to a type of a virtualized device (e.g., router, switch, NAT, etc.), a network session type, a time frame of the network traffic (e.g., time of day, week, year), or other parameter.

In comparing a network traffic metric to a corresponding statistical model, the network traffic metric may be compared to a corresponding data point in the statistical model to determine whether the data point falls inside or outside of the functional state baseline. If the data point falls within the functional state baseline, the primary virtualized device 106 may be in a functional state. If the data point falls outside of the functional state baseline, then the primary virtualized device 106 may be in a non-functional state. More specifically, a network traffic metric representing a particular network session state (e.g., a TCP session state) during a time frame may be compared with a data point in a statistical model representing the historical network session state that corresponds to the same time frame of the network traffic metric. As an illustration, a network traffic metric for a number of established TCP network connections may be generated by analyzing network packets that are transmitted through the hypervisor 112 to determine whether any of the network packets are associated with the primary virtualized device 106 and to determine whether the network packets represent an established TCP session state. The network traffic metric may then be compared with a data point in the statistical model corresponding to a time frame of the network traffic metric to determine whether the data point falls within a functional state baseline representing a number of established TCP network connections for the time frame.

Multiple network traffic metrics representing different network session states may be compared to data points in the statistical models corresponding to the historical network traffic metrics. For example, network traffic metrics may represent TCP sessions states that include SYN-SENT, SYN RECEIVED, ESTABLISHED, CLOSED-WAIT, CLOSING, LAST-ACK, CLOSED as well as other TCP session states. The results of the comparisons may determine whether a primary virtualized device 106 may be in a functional state or a non-functional state.

As an illustration, network traffic metrics representing a number of SYN-SENT, SYN RECEIVED and ESTABLISHED TCP session states may be generated. The network traffic metrics may then be compared to data points in statistical models that represent the historical TCP session states and correspond with a time frame of the network traffic metrics. A determination may then be made whether any of the current data points corresponding to the network traffic metrics fall outside of functional state baselines in the statistical models for the TCP session states. The determinations or comparisons may continue periodically on an ongoing basis (e.g., the comparisons may occur every second or every few seconds) In one example, if any of the data points fall outside of the functional state baselines of the statistical models, then the primary virtualized device 106 may be in a non-functional state. In another example, if a majority of the data points fall outside of the functional state baselines of the statistical models, then the primary virtualized device 106 may be in a non-functional state. And in another example, if each of the network traffic metrics fall outside of the functional state baselines of the statistical models, then the primary virtualized device 106 may be in a non-functional state. The example determinations and comparisons provided above are not exclusive, other methods that compare network traffic metrics to corresponding statistical models to determine that a virtualized device is within a non-functional state are within the scope of this disclosure.

In the event that a failure of the primary virtualized device 106 may be detected by comparing traffic metrics with corresponding statistical models, a failover to a secondary virtualized device 108 may be triggered. In one example configuration, the primary virtualized device 106 and the secondary virtualized device 108 may be configured as a redundant pair where network state information may be synchronized between the primary virtualized device 106 and the secondary virtualized device 108. Thus, the secondary virtualized device 108 may include current network traffic information (e.g., routing tables, network policies, firewall settings, etc.), which may result in little or no interruption in network traffic when transitioning from the primary virtualized device 106 to the secondary virtualized device 108.

In one example configuration, failing over to the secondary virtualized device 108 may be performed by disassociating a network address from the primary virtualized device 106 and associating the network address with the secondary virtualized device 108. For example, the failover service 110 may be configured to update an internal routing table for a physical host on which the failover service 110 resides. The routing table may be updated to direct network traffic to the secondary device 108.

In another example, failing over to the secondary virtualized device 108 may be performed by disassociating a virtual network interface from the primary virtualized device 106 and associating the virtual network interface with the secondary device 108. The virtual network interface may allow computing systems to connect to servers (e.g., computing instances) through a network via one or more virtualized devices. Thus, by associating a virtual network interface with a virtualized device, network traffic may be transmitted through the virtualized device so that the purpose of the virtualized device (e.g., routing network traffic, network security, address translation, etc.) may be performed.

After a failover to the secondary virtualized device 108, processing of network traffic may be taken over by the secondary virtualized device 108. Further, as a result of detecting that the primary virtualized device 106 may be in a non-functional state and failing over to the secondary virtualized device 108 via an internal routing table update or a reassignment of a virtual network interface, the state of network connections for the computer network may be preserved, as may not be the case where API calls are used to execute the failover (i.e., network state tables may expire due to the length of time to perform the API calls).

Figure 2:
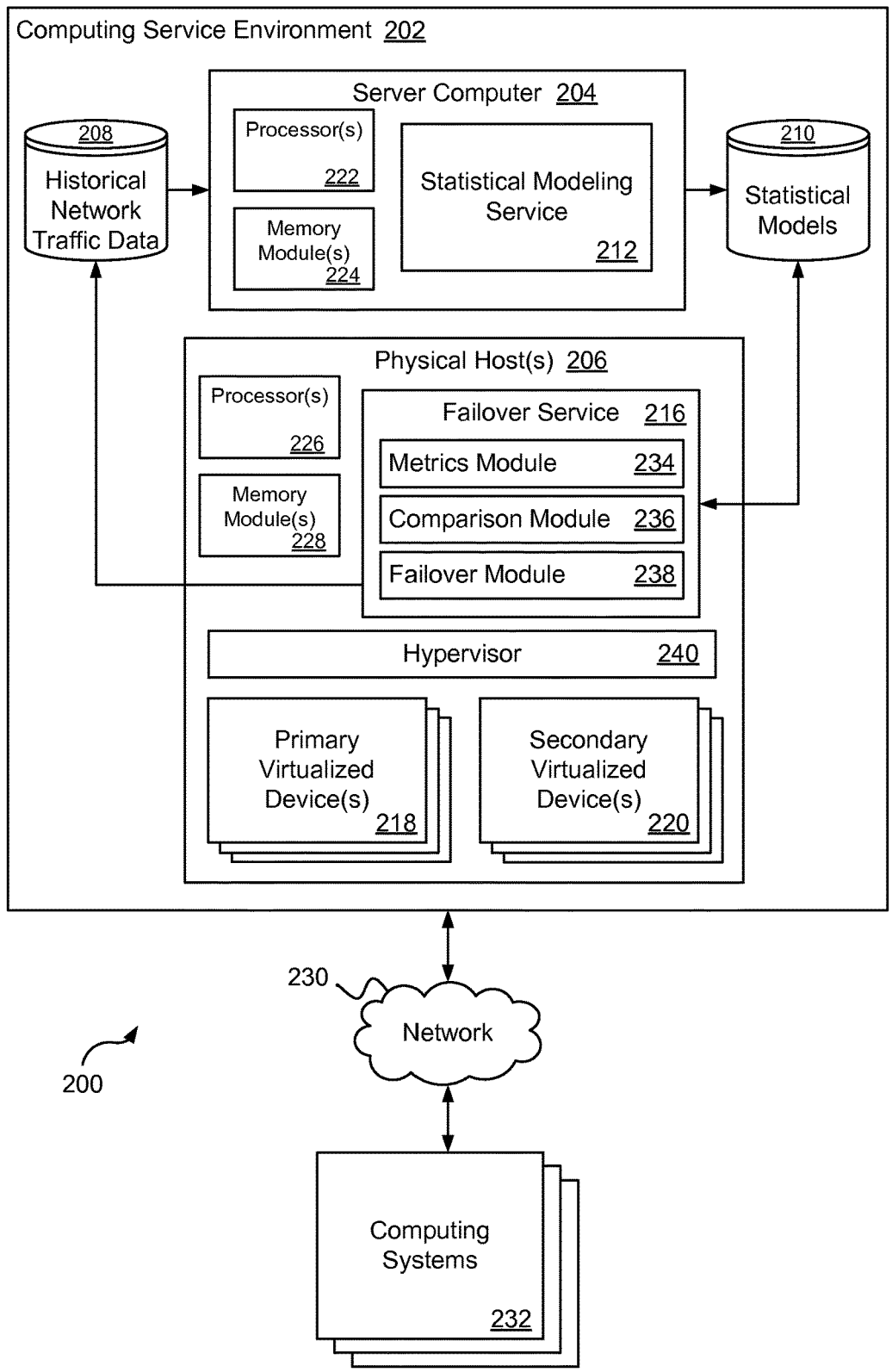
FIG. 2 is a block diagram that illustrates various example components included in a system for monitoring the functional state of a primary virtualized device.

FIG. 2 illustrates components of an example system 200 on which the present technology may be executed. The system 200 may include a computing service environment 202 that contains a server computer 204, one or more physical hosts 206 and other components of a computing service environment 202 not specifically shown here. The computing service environment 202 may be in communication with a plurality of computing systems 232 by way of a network 230. Communications between the computing systems 232 and the computing service environment 202 may be handled by a primary virtualized device 218. For example, a primary virtualized device 218 may act as an edge device (e.g., a device providing an entry point into a network such as a router or a switch) for a virtualized computing network or a virtual private network hosted by one or more remote servers, or the primary virtualized device 218 may provide some other network function, such as a NAT service or a firewall.

The server computer 204 may contain a statistical modeling service 212 configured to generate a number of statistical models 210 representing functional states of various primary virtualized devices 218. In one example configuration, historical network traffic data 208 for a primary virtualized device 218 may be collected and stored in a data store. The historical network traffic data 208 may be associated with past network traffic handled by the primary virtualized device 218 over a period of time. For example, the historical network traffic data 208 may be for various TCP sessions handled by the primary virtualized device 218 where, in one example, the TCP sessions may be categorized as SYN-SENT, SYN RECEIVED, ESTABLISHED, CLOSED-WAIT, CLOSING, LAST-ACK and CLOSED.

The statistical modeling service 212 may be configured to retrieve the historical network traffic data 208 for a primary virtualized device 218 from storage and generate a statistical model 210 for the historical network traffic data 208. A statistical model 210 may be for a particular network session type during a time frame of the historical network traffic data 208. For example, a statistical model 210 may be for a SYN-SENT, a SYN RECEIVED or an ESTABLISHED TCP session.

A statistical model 210 may include a functional state baseline as described in relation to FIG. 1. The functional state baseline may represent a functional state of the primary virtualized device 218 during different time frames represented by the statistical model 210. Namely, the functional state baseline may represent, for example, an average, mean, median, mode, or raw total amount of network traffic for a network traffic type handled by the primary virtualized device 218 during a particular point in time. Data points in a statistical model 210 falling outside of the functional state baseline may represent a non-functional state of the primary virtualized device 218.

Statistical models 210 generated by the statistical modeling service 212 may be stored in a data store, thereby making the statistical models 210 available to the failover services 216. In one example, the statistical models 210 may be updated or regenerated periodically to account for network traffic changes that may occur over time. For instance, as primary virtualized devices 218 continually produce network traffic data that may be added to the historical network traffic data 208, updated statistical models 210 may be generated by the statistical modeling service 212. As a result, a definition of a functional state for a primary virtualized device 218 may evolve over time as network traffic handled by the primary virtualized device 218 changes.

The physical host 206 may host one or more primary virtualized devices 218 and one or more secondary virtualized devices 220 that may be configured as a redundant pair. As illustrated, the physical host 206 may host a failover service 216. The failover service 216 may execute within the physical host's operating system, or alternatively may execute within a hypervisor 240 as shown in FIG. 1.

In one example configuration, the failover service 216 may include a metrics module 234, a comparison module 236 and a failover module 238. The metrics module 234 may be configured to generate network traffic metrics for current network traffic handled by a primary virtualized device 218. For example, metrics for network traffic that may be handled by the primary virtualized device 218 may be calculated. The network traffic metrics may correspond to network traffic types (e.g., TCP session types) included in the statistical models 210. For example, a network traffic metric may be generated for a number of TCP SYN messages which may be compared to a TCP SYN messages statistical model.

Network traffic metrics generated using the metric module 234 may be provided to the comparison module 236. In one example configuration, the comparison module 236 may be configured to identify a statistical model 210 for a primary virtualized device 218 that corresponds to a network traffic metric and compare the network traffic metric provided by the metrics module 234 with the statistical model 210. For example, a data point may be identified in the statistical model 210 that corresponds with the value of the network traffic metric for a time frame of a network traffic metric. A determination may then be made whether the data point falls within or falls outside of a functional state baseline defined by the statistical model.

After determining that a primary virtualized device 218 may be in a non-functional state, the failover module 238 may be configured to perform a failover from the primary virtualized device 218 to a secondary virtualized device 220. The primary virtualized device 218 and the secondary virtualized device 220 may be a redundant pair. As a result, network state information may be kept current on both devices and failing over to the secondary virtualized device 220 may be performed without having to update network state information on the secondary virtualized device 220.

In one example, failover from a primary virtualized device 218 to a secondary virtualized device 220 may be performed by triggering a routing change in the virtual network infrastructure resulting in network traffic being routed to the secondary virtualized device 220. In one example, a physical host's routing table (e.g., an internal routing table) may be updated to point to the secondary virtualized device 220. Because the routing table may be updated quickly (as compared to making an API call), a failover to the secondary virtualized device 220 may be performed with minimal or no impact on network traffic flow.

In another example, failover from a primary virtualized device 218 to a secondary virtualized device 220 may be performed by reassigning a virtual network interface to the secondary virtualized device 220, which may be performed quickly, as compared to making an API call, resulting in a failover to the secondary virtualized device 220 with minimal impact on network traffic flow. Illustratively, a virtual network interface may be attached to a computing instance that hosts a primary virtualized device 218. The virtual network interface may have attributes that include one or more private network addresses and a public network address. A private network address for the virtual network interface may be detached from a computing instance (e.g., in the case that a primary virtualized device 218 fails) and may be attached to a second computing instance (e.g., to a secondary virtualized device 220). When moving a virtual network interface from one computing instance to another, network traffic may be redirected to the new computing instance.

The various processes and/or other functionality contained within the computing system environment 202 may be executed on one or more processors 222 and 226 that are in communication with one or more memory modules 224 and 228. The computing system environment 202 may include a number of computing devices (e.g., the server computer 204 and the physical host 206) that are arranged, for example, in one or more server banks or computer banks or other arrangements. The computing devices may support a computing environment using hypervisors, virtual machine monitors (VMMs) and other virtualization software.

Data stores may be used to store the historical network traffic data 208 and the statistical models 210. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

A network 230 used to communicate between various computing systems 232 and the computing service environment 202, and within the computing service environment 202 may include any useful computing network, including an intranet, the Internet, a local area network, a wide area network, a wireless data network, or any other such network or combination thereof. Components utilized for such a system may depend at least in part upon the type of network and/or environment selected. Communication over the network 230 may be enabled by wired or wireless connections and combinations thereof. A network utilized within a physical host 206 may include a virtualized network, which may be a combination of hardware and software network resources that provide network functionality.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
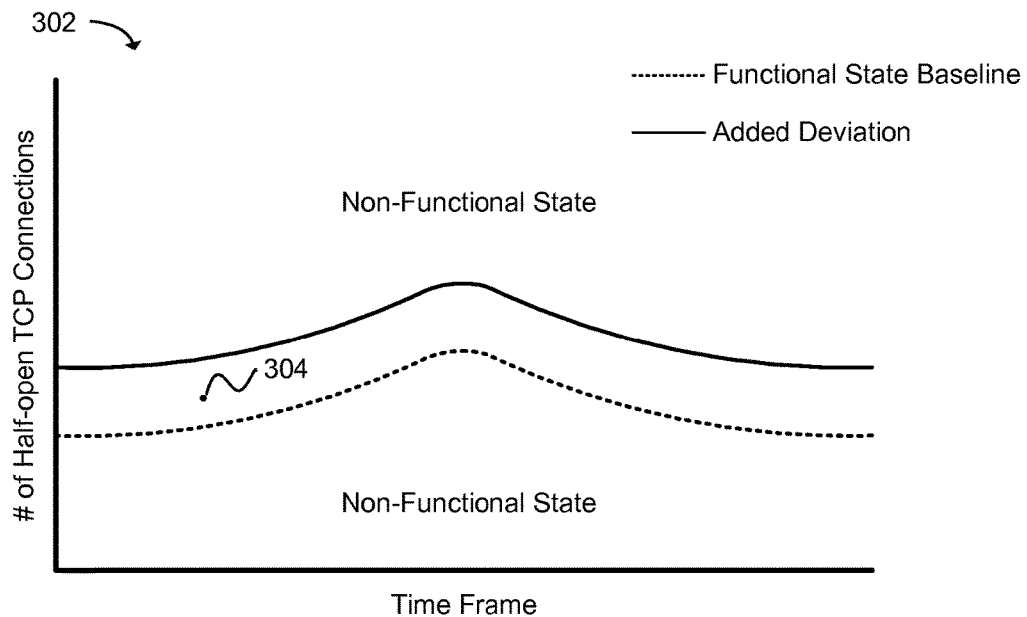
FIG. 3 is a diagram illustrating example statistical models that may be compared with network traffic metrics to detect a failure of a virtualized network device.
Figure 3:
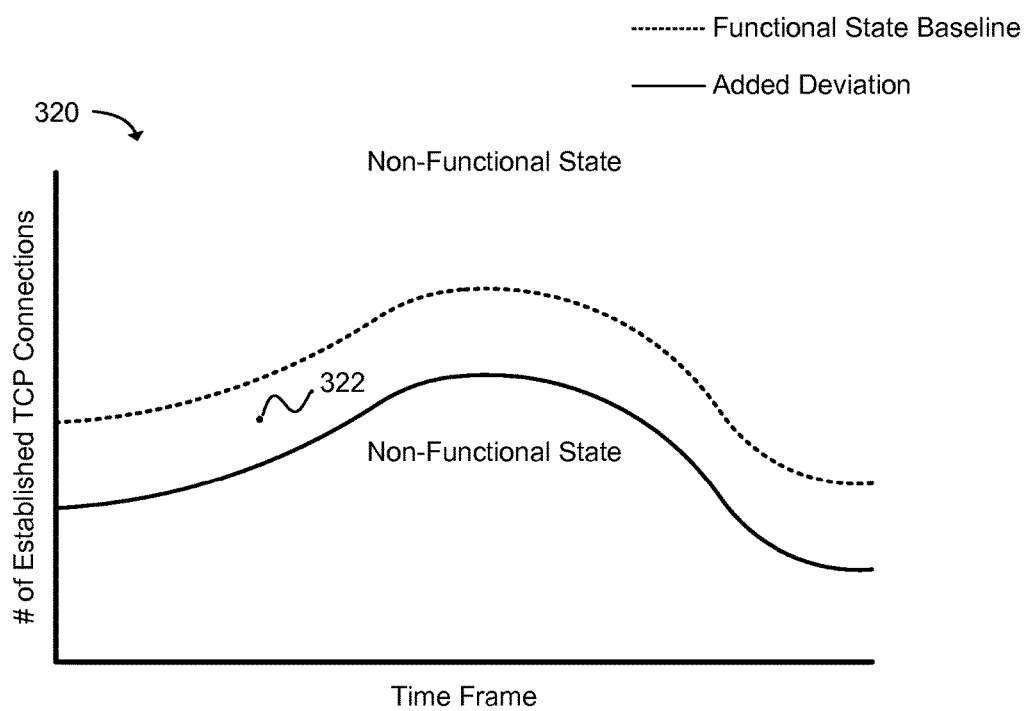

FIG. 3 is a diagram illustrating a statistical model 302 for a number of half-open TCP connections (e.g., SYN RECEIVED session states) and a statistical model for 320 for a number of established TCP connections (e.g., ESTABLISHED session states). FIG. 3 illustrates that a statistical model may be constructed for individual network traffic metrics that may be used to monitor the functional status of a virtualized network device. The statistical models 302 and 320 may include functional state baselines representing a typical number of network sessions (i.e., SYN-RECEIVED and ESTABLISHED respectively) handled by a virtualized network device. Further, the statistical models 302 and 320 show a deviation or variance that may be applied to the functional state baselines that result in increasing a tolerance of the functional state baselines.

Increasing the tolerance of a functional state baseline may reduce a number of false positives when making a determination that a virtualized network device is in a non-functional state. For example, prior to increasing the tolerance of the functional state baseline for the statistical model 302, a data point 304 or 322 for a network traffic metric (e.g., a number of half-open TCP connections) in the statistical model 302 may fall outside of the functional state baseline, indicating that a virtualized network device associated with the network metric may be in a non-functional state, where in fact the virtualized network device may be in a functional state. Because the tolerance of the functional state baseline may be small, a large number of false positives may be produced resulting in unnecessary failovers of the virtualized network device. After increasing the tolerance of the functional state baseline for the statistical model 302, the same data point 304 or 322 may now fall within the functional state baseline, indicating that the virtualized network device may be in a functional state, resulting in fewer false positives.

In one example, a tolerance of a functional state baseline may be increased by determining a deviation (e.g., a standard deviation). For example, a standard deviation may be calculated and applied to a functional state baseline in a statistical model. In another example configuration, a variance used to increase the tolerance of a functional state baseline may be an arbitrary value as determined by a system administrator. In some examples, the tolerance of a functional state baseline may be increased or decreased according to a type of a virtualized network device (e.g., router, switch, NAT, etc.), a network session category (e.g., SYN-RECEIVED, ESTABLISHED, etc.), a time frame of the network traffic (e.g., time of day, week, year), or other parameter. For example, a first variance may be used to increase the tolerance of a functional state baseline in a statistical model for a virtualized router, switch, or gateway and a second variance may be used to increase the tolerance of a functional state baseline in a statistical model for a virtualized fire wall, NAT service or DNS name service.

Figure 4:
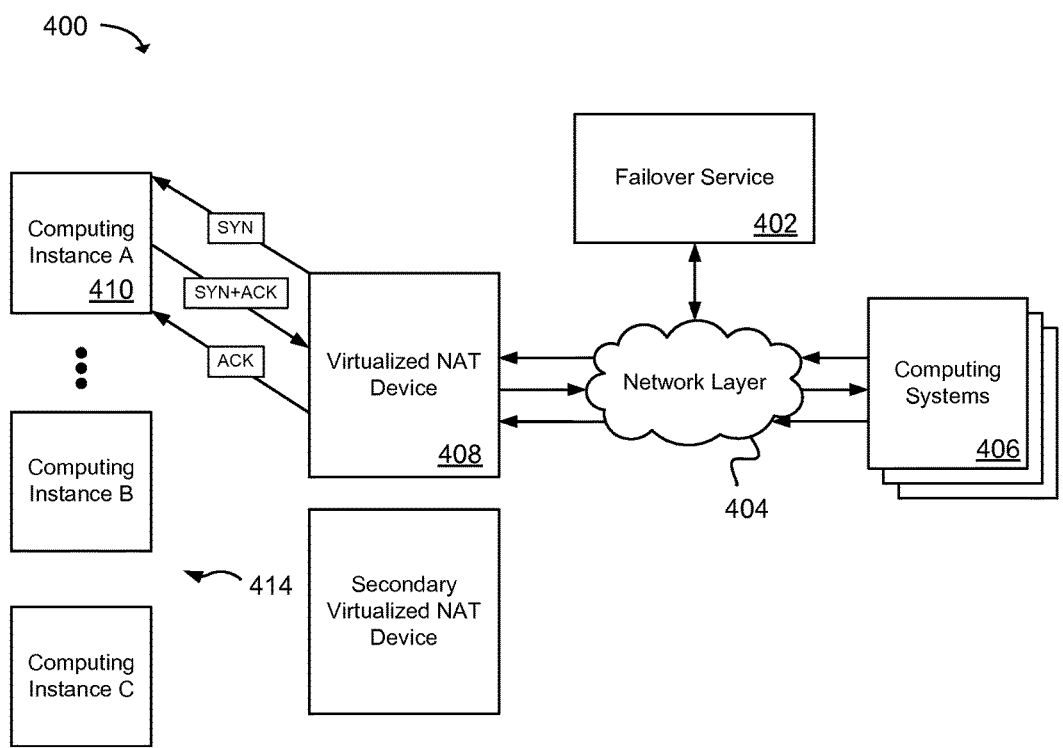
FIG. 4 is a block diagram illustrating an example system for monitoring the functional state of a virtualized NAT device and failing over to a secondary virtualized NAT device after detecting a failure of the virtualized network device.

FIG. 4 is a block diagram illustrating an example system 400 for monitoring the functional state of a virtualized network device and failing over to a secondary virtualized network device after detecting a failure of the virtualized network device. As illustrated, the virtualized network device in this example is a virtualized NAT (Network Address Translation) device 408. FIG. 4 illustrates the flow of network traffic based on the TCP protocol through the system 400 between a number of computing systems 406 that may be within a virtual network environment or may be external to the virtual network environment and a number of computing instances 414. A computing instance 414 may be a virtual machine (e.g., an instance of a software implementation of a computer) that executes applications like a physical machine.

Included in the system 400 may be a failover service 402 that may be configured to monitor TCP network traffic transmitted through a network layer 404 of the virtual network environment (e.g., through a hypervisor). Accordingly, the failover service 402 may inspect TCP network packets as they are transmitted through the network layer 404 to determine whether the TCP network packets have been or will be handled by the virtualized NAT device 408, as well as determine the content of the TCP network packets. For example, the failover service 402 may be able to determine what type of TCP protocol operation the TCP network packet may be associated with.

In monitoring a functional state of the virtualized NAT device 408, the failover service 402 may track TCP network traffic handled by the virtualized NAT device 408 to define a baseline of TCP network traffic that models a functional state of the virtualized NAT device 408. More specifically, by tracking TCP network traffic handled by the virtualized NAT device 408, a statistical model may be constructed representing a typical amount of network traffic handled by the virtualized NAT device 408. As such, a functional state of the virtualized NAT device 408 may be represented by the statistical model.

Illustratively, various TCP states defined by the TCP protocol may be monitored using the failover service 402 to determine the functional state of the virtualized NAT device 408. The TCP states may be used in establishing a TCP network connection. For example, using the "three way handshake" TCP protocol, a computing system 406 may send a SYN packet to a destination host (e.g., computing instance 410). After receiving the SYN packet, the destination host may send the computing system 406 a SYN-ACK packet acknowledging the computing system's request to establish a network connection. At this point a half-open TCP connection may exist. The computing system 406 then sends an ACK packet to the destination host to fully establish the TCP connection, at which point packets may be sent back and forth between the computing system 406 and the destination host (e.g., the computing instance 410).

In one example, the number of TCP session states used to establish TCP connections handled by the virtualized NAT device 408 may be monitored to determine the functional state of the virtualized NAT device 408. For example, a number of SYN messages, SYN-ACK messages and ACK messages may be compared to corresponding statistical models to determine whether the number of TCP session states fall within a number of TCP sessions states typically handled by the virtualized NAT device 408.

As one specific example, based on the concept that a number of SYN states and a number of SYN-ACK states handled by a virtualized network device should be approximately the same, accounting for normally occurring network errors, network metrics for current SYN states and SYN-ACK state may be compared to corresponding statistical models to determine whether both the number of current SYN states and SYN-ACK states fall within the range of SYN states and SYN-ACK states typically handled by the virtualized NAT device 408. In the case that the number of SYN-ACK states is much lower than the number of SYN states, as evidenced by the network metric for current SYN-ACK states falling outside of the range of the functional state baseline defined by the statistical model, the virtualized NAT device 408 may be in a non-functional state.

As another specific example, a number of currently established TCP connections may be monitored and compared to a statistical model representing a number of TCP connections that the virtualized NAT device 408 typically handles for the current time frame. For example, a network traffic metric may be generated representing a number of ACK states the virtualized NAT device 408 may be currently handling. The network traffic metric may then be compared to a corresponding statistical model of ACK states to determine whether the network traffic metric may be within a range of a number of ACK states typically handled by the virtualized NAT device 408 during the current time frame.

Although a virtualized NAT device 408 is described in FIG. 4 to illustrate the concepts above, it is understood that any virtualized network device may take the place of the virtualized NAT device 408 in FIG. 4. Network traffic metrics used to determine the functional state of a virtualized network device are not limited to those described above. Other network traffic metrics may be used to determine the functional state of a virtualized network device and are within the scope of this disclosure.

Figure 5:
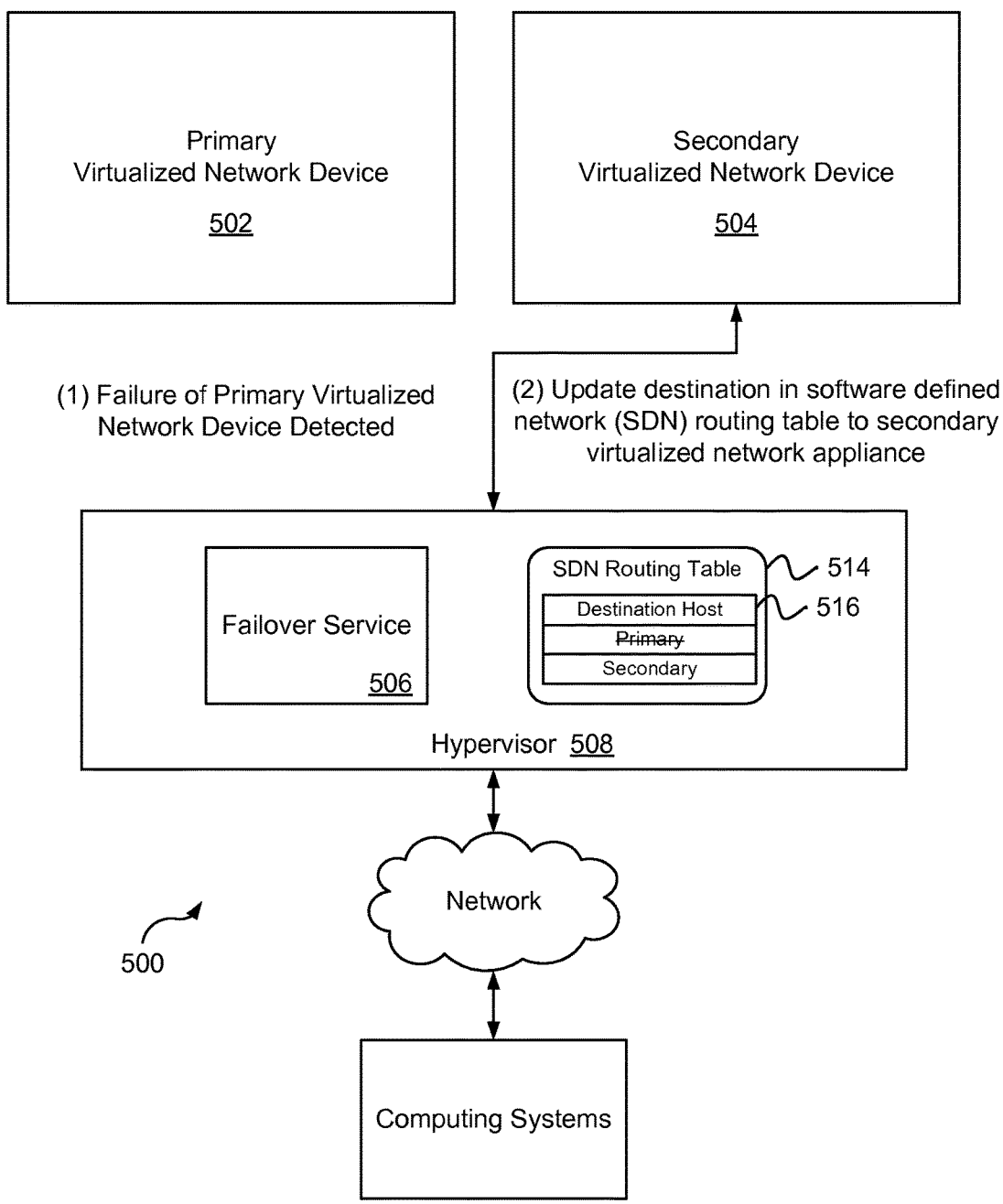
FIG. 5 is a block diagram that illustrates an example system and method for failing over to a secondary virtualized network device by updating an internal routing table.

Moving now to FIG. 5, a block diagram illustrates an example system and method 500 for failing over to a secondary virtualized network device 504 by updating a software defined network (SDN) routing table 514 containing network addresses for virtualized network devices hosted by a physical host. Software defined networking may be the abstraction of lower level network functionality that enables virtualized network services to be managed via a control plane. In one example, when failing over to a secondary virtualized network device 504 after detecting that a primary virtualized network device 502 may be in a non-functional state as described earlier, a failover service 506 included in a hypervisor 508 may be configured to update an SDN routing table 514 that directs network traffic to the primary virtualized network device 502. Updating of the SDN routing table 514 may be performed via a control plane resulting in revising a network map and propagating network address changes throughout the SDN. For instance, the destination 516 address for a virtualized network device in the SDN routing table 514 may be updated to point from the primary virtualized network device 502 to the secondary virtualized network device 504. As a result, network traffic may be routed to the secondary virtualized network device 504 after the failure of the primary virtualized network device 502.

Figure 6:
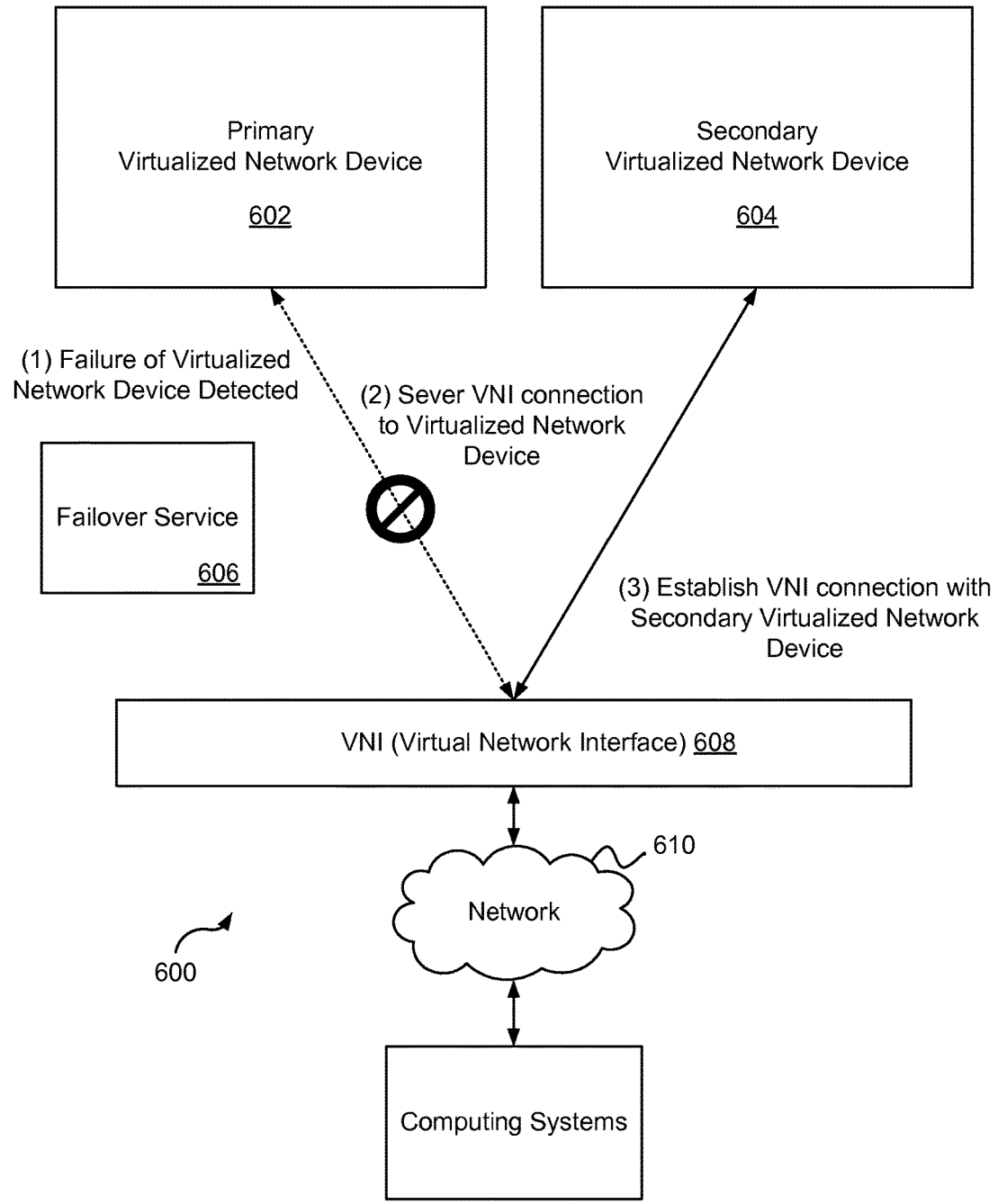
FIG. 6 is a block diagram illustrating an example system and method for failing over to a secondary virtualized network device by reassigning a virtual network interface to the secondary virtualized network device.

FIG. 6 is a block diagram illustrating one example of a system and a method 600 for failing over to a secondary virtualized network device 604 by reassigning a virtual network interface to a secondary virtualized network device 604. A virtual network interface 608 may be attached to a primary virtualized network device 604 in order to establish a network connection between the primary virtualized network device 604 and the rest of a network 610. A private network address for the virtual network interface 608 may be detached from the primary virtualized network device 604 (e.g., in the case that the virtualized network device 604 fails) and may be attached to a secondary virtualized network device 604. When moving a virtual network interface 608 from a primary virtualized network device 604 to a secondary virtualized network device 604, network traffic may be redirected to the secondary virtualized network device 604.

The system may include a failover service 606 that may monitor the functional state of the primary virtualized network device 602. The system may also include a secondary virtualized network device 604 that may be part of a redundant pair with the primary virtualized network device 602.

In the example method illustrated, as a result of (1) the failover service 606 detecting that the primary virtualized network device may be in a non-functional state, the failover service 606 may be configured to (2) execute a failover action that disassociates (e.g., detaches or severs) a virtual network interface 608 from the primary virtualized network device 602 and (3) establishes or attaches a virtual network interface 608 connection to the secondary virtualized network device 604. Reassignment of a virtual network interface 608 may be performed within a hypervisor or a within physical host. As a result, the failover to the secondary virtualized network device 604 may be performed in an amount of time that may be less than an amount of time used when calling multiple API services used to reassign a virtual network interface connection 608.

Figure 7:
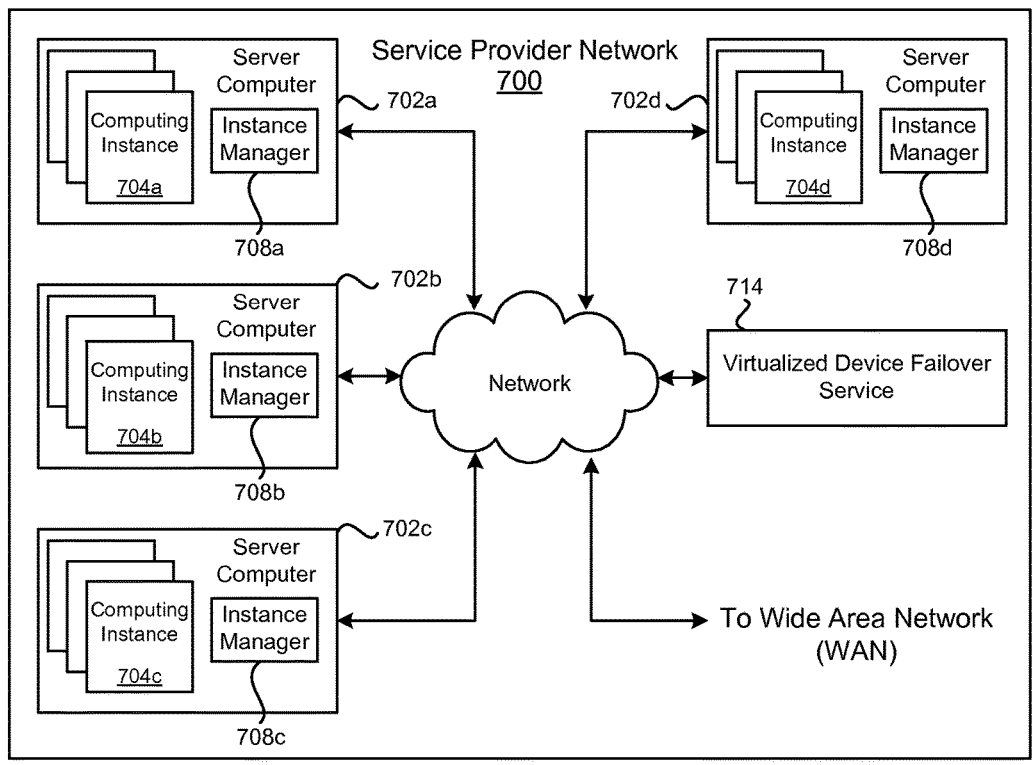
FIG. 7 is a block diagram that illustrates an example service provider network that includes a virtualized device failover service.

FIG. 7 is a block diagram illustrating an example service provider network 700 that may include a virtualized device failover service 714. In particular, the computing service 300 depicted illustrates one environment in which the technology described herein may be used. The computing service 700 may be one type of environment that includes various virtualized service resources that may be used, for instance, to host computing instances 704a-d.

The service provider network 700 may be capable of delivery of computing, storage and networking capacity as a software service to a community of end recipients. In one example, the service provider network 700 may be established for an organization by or on behalf of the organization. That is, the service provider network 700 may offer a "private cloud environment." In another example, the service provider network 700 may support a multi-tenant environment, wherein a plurality of customers may operate independently (i.e., a public cloud environment). Generally speaking, the service provider network 700 may provide the following models: Infrastructure as a Service ("IaaS"), Platform as a Service ("PaaS"), and/or Software as a Service ("SaaS"). Other models may be provided.

The particularly illustrated service provider network 700 may include a plurality of physical hosts 702a-d. The service provider network 700 may provide computing resources for executing computing instances 704a-d. Computing instances 704a-d may, for example, be virtual machines that may be an instance of a software implementation of a machine (i.e. a computer) that executes applications like a physical machine. In the example of a virtual machine, each of the physical hosts 702a-d may be configured to execute an instance manager 708a-d capable of executing the instances. The instance manager 708a-d may be a hypervisor, virtual machine monitor (VMM), or another type of program configured to enable the execution of multiple computing instances 704a-d on a single server. Additionally, each of the computing instances 704a-d may be configured to execute one or more applications.

A server computer 714 may execute a virtualized device failover service. For example, the server computer 714 may execute a virtualized device failover service configured to monitor the functional state of a primary virtualized device executing on a computing instance 704a-d. The virtualized device failover service may also monitor the state of a computing instance 704a-d and a computing instance 704a-d may be identified as having problems due to comparing a network traffic metric for current network traffic handled by the computing instance with a data point in a statistical model corresponding to the network traffic metric and the time frame for the network traffic metric in order to monitor the functional state of the computing instance. When a computing instance is deemed to be failing, then a replacement instance may be launched and the computing instance may be migrated to the replacement instance or may simply be replaced. Similarly, other services in the service provider network can be monitored in the same way and when the current network traffic for the service is outside a specified constraint then a warning alarm may be triggered. Examples of such services that may be monitored may include computing services, storage services, networking services, database clusters, message queuing, and other similar virtualized services.

Figure 8:
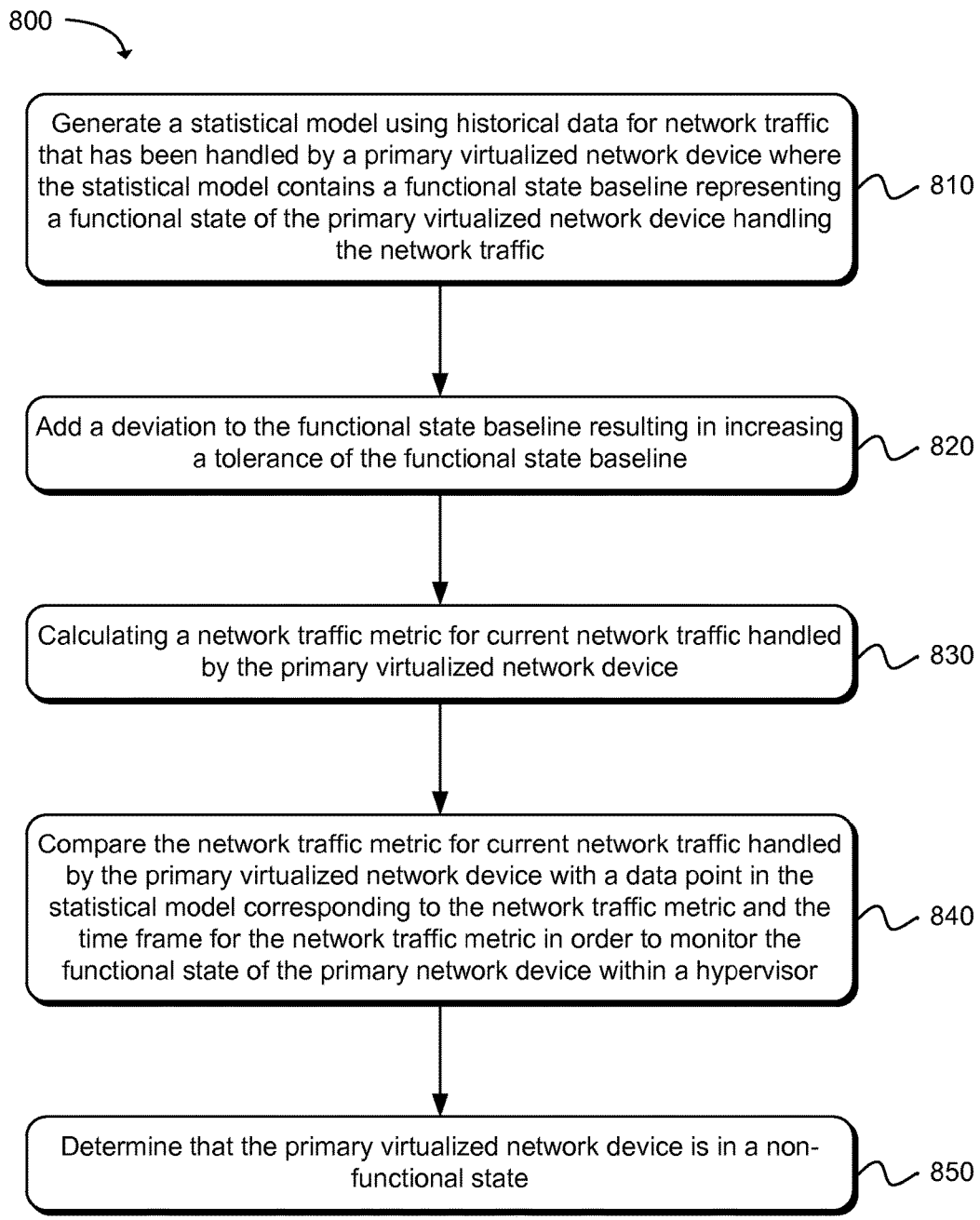
FIG. 8 is a flow diagram that illustrates an example method for detecting a failure of a primary virtualized device and failing over to a secondary virtualized device.

FIG. 8 is a flow diagram illustrating an example method 800 for detecting a failure of a primary virtualized network device and failing over to a secondary virtualized network device after detecting the failure of the primary virtualized network device. As in block 810, a statistical model may be generated using historical data for network traffic that has been handled by a primary virtualized network device, where the statistical model may contain a functional state baseline representing a functional state of the primary virtualized network device handling the network traffic. As in block 820, a deviation may be added to the functional state baseline resulting in increasing a tolerance of the functional state baseline. As a result, a range of network traffic typically handled by the primary virtualized network device may be established.

As in block 830, the functional state of the primary virtualized network device may be monitored by calculating a network traffic metric for current network traffic handled by the primary virtualized network device. As in block 840, the network traffic metric for current network traffic handled by the primary virtualized network device may then be compared with a data point in the statistical model corresponding to the network traffic metric and the time frame for the network traffic metric. In one example, monitoring of the functional state of the primary virtualized network device may be performed within a hypervisor.

In one example, the network traffic metrics may be generated by collecting network traffic data for network packets transmitted through a network layer of a hypervisor, where the network packets are handled by the primary virtualized network device. The network traffic metrics may then be generated using the network traffic data. A time frame for the network metrics may be identified allowing for the network metrics to be compared to corresponding statistical models for the time frame.

As in block 850, a determination may be made that the primary virtualized network device may be in a non-functional state as a result of detecting that the primary virtualized network device may be in a non-functional state. In response, a fail over to a secondary virtualized network device may be performed, where the primary virtualized network device and the secondary virtualized network device may be configured as a redundant pair such that the failover may have a minimal impact on current network traffic.

In one example, a failover to a secondary virtualized network device may be performed by disassociating an internal address from the virtualized network device and assigning the internal address to the secondary network device. In another example, a failover to a secondary virtualized network device may be performed by disassociating a virtual network interface from the primary virtualized network device and associating the virtual network interface with a secondary network device as a result of determining that the primary virtualized network device is in a non-functional state.

Figure 9:
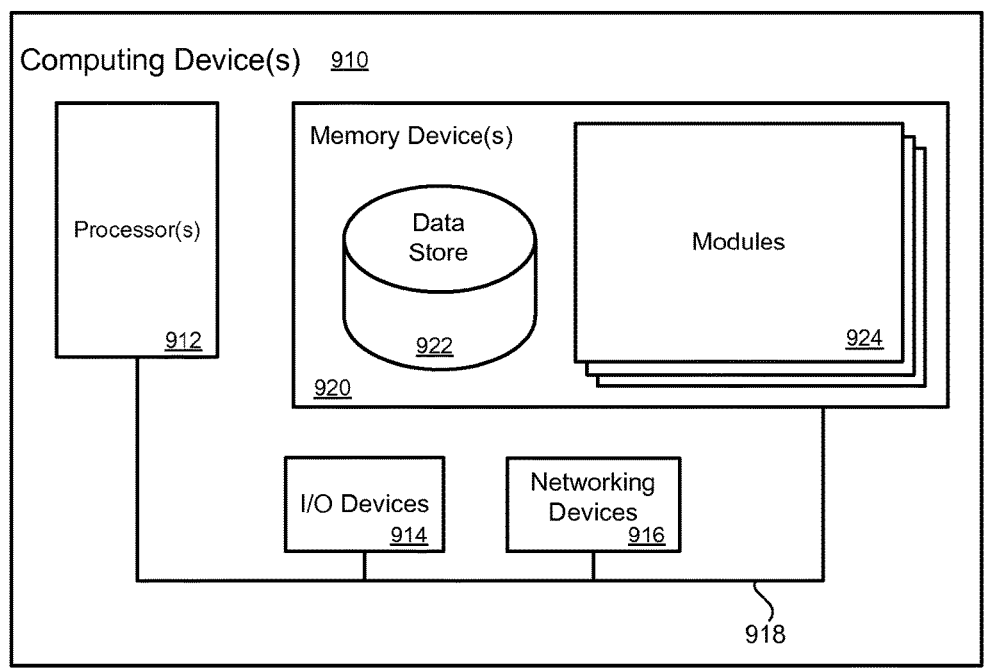
FIG. 9 is block diagram illustrating an example of a computing device that may be used to execute modules for monitoring a functional state of a virtualized device and failing over to a secondary virtualized device after detecting that the virtualized device may be in a non-functional state.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. The modules 924 may include a metrics module, a comparison module, a failover module, as well as other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, wherein the instructions, when executed by at least one processor:
    monitor a functional state of a primary virtualized network device using a hypervisor configured to:
    calculate TCP (Transmission Control Protocol) traffic metrics for current TCP network traffic transmitted through a network layer of the hypervisor and handled by the primary virtualized network device;
    compare the TCP traffic metrics for current TCP network traffic handled by the primary virtualized network device with data points in a statistical model corresponding to the TCP traffic metrics and the time frame for the TCP traffic metrics,
    wherein the statistical model is generated using historical data relating to previous TCP network traffic handled by the primary virtualized network device during a time frame, the statistical model containing a functional state baseline representing a functional state of the primary virtualized network device handling the previous TCP network traffic during the time frame;
    determine that the primary virtualized network device is in a non-functional state as a result of at least one of the data points in the statistical model corresponding to the TCP traffic metrics falling outside of the functional state baseline; and
    failover to a secondary virtualized network device at least partly based on having detected that the primary virtualized network device is in the non-functional state.

2. The non-transitory machine readable storage medium as in claim 1, wherein the failover is triggered as a result of determining that the primary virtualized network device is in the non-functional state.

3. The non-transitory machine readable storage medium as in claim 1, wherein the instructions, when executed by the at least one processor, cause the failover to the secondary virtualized network device by:
    disassociating an IP (Internet Protocol) address from the primary virtualized network device; and
    associating the IP address with the secondary virtualized network device.

4. A computer implemented method, comprising:
    identifying a statistical model using historical data and at least one processor, the historical data being for network traffic handled by a primary virtualized device during a time frame and the statistical model containing a functional state baseline representing a functional state of the primary virtualized device handling the network traffic during the time frame; and
    monitoring the functional state of the primary virtualized device using a hypervisor configured for:
        calculating a network traffic metric for current network traffic transmitted through a network layer of the hypervisor and handled by the primary virtualized device, using the at least one processor;
        comparing the network traffic metric for current network traffic handled by the primary virtualized device with a data point in the statistical model corresponding to the network traffic metric and the time frame for the network traffic metric in order to monitor the functional state of the primary virtualized device using the hypervisor and the at least one processor; and
        determining, based on a result of the comparing, that the primary virtualized device is in a non-functional state, using the at least one processor.

5. The method as in claim 4, further comprising failing over to a secondary virtualized device at least partly based on having detected that the primary virtualized device is in the non-functional state, wherein the primary virtualized device and the secondary virtualized device are configured as a redundant pair.

6. The method as in claim 4, wherein monitoring the functional state of the primary virtualized device further comprises:
    collecting network traffic data for network packets transmitted through a network layer of a hypervisor, where the network packets are handled by the primary virtualized device;
    generating the network traffic metric using the network traffic data;
    identifying a time frame for the network traffic metric; and
    identifying the data point included in the statistical model that corresponds to the time frame.

7. The method as in claim 4, wherein monitoring the functional state of the primary virtualized device comprises collecting network traffic information associated with a state of the network traffic handled by the primary virtualized device and does not comprise obtaining state information from the primary virtualized device.

8. The method as in claim 4, wherein generating the statistical model for the network traffic that has been handled by the primary virtualized device further comprises, generating the statistical model for TCP network traffic and monitoring current TCP network traffic handled by the primary virtualized device.

9. The method as in claim 4, wherein monitoring the functional state of the primary virtualized device further comprises, comparing a network traffic metric representing a number of current half-open TCP connections to a data point in the statistical model corresponding to a time frame of the network traffic metric representing the number of half-open TCP connections.

10. The method as in claim 4, wherein monitoring the functional state of the primary virtualized device further comprises, comparing a network traffic metric representing a number of current TCP connections to a data point in the statistical model corresponding to a time frame of the network traffic metric representing the number of TCP connections.

11. The method as in claim 4, further comprising determining that the primary virtualized device is in the non-functional state as a result of network traffic metrics representing a number of current TCP connections and current half-open TCP connections falling below a number of TCP connections and half-open TCP connections represented by the functional state baseline.

12. The method as in claim 5, further comprising disassociating a network address from the primary virtualized device and assigning the network address to the secondary virtualized device as a result of determining that the primary virtualized device is in the non-functional state.

13. The method as in claim 12, further comprising updating a route in a software defined network route table to route network traffic to the secondary virtualized device as a result of determining that the primary virtualized device is in the non-functional state.

14. The method as in claim 12, further comprising disassociating a virtual network interface from the primary virtualized device and associating the virtual network interface with the secondary virtualized device as a result of determining that the primary virtualized device is in the non-functional state.

15. The method as in claim 4, wherein the steps of claim 4 are performed within a service provider network to monitor services that provide computing services to customers.

16. The method as in claim 4, wherein the primary virtualized device is used to manage network traffic for a virtual private network hosted by at least one remote server.

17. A system comprising:
at least one processor;
a memory device including instructions that, when executed by the at least one processor, cause the system to:
generate a statistical model using historical data and the at least one processor, the statistical model containing a functional state baseline representing a functional state of a primary virtualized network device and the historical data being for previous network traffic that has been handled by the primary virtualized network device included in a virtual network during a time frame;
add a deviation to the functional state baseline resulting in increasing a tolerance of the functional state baseline;
monitor the functional state of the primary virtualized network device using a hypervisor configured to (i) calculate network traffic metrics for current network traffic transmitted through a network layer of the hypervisor and handled by the primary virtualized network device, and (ii) compare the network traffic metrics for the current network traffic handled by the primary virtualized network device with data points in the statistical model corresponding to the network traffic metrics;
determine that the primary virtualized network device is in a non-functional state; and
reassign a virtual network interface from the primary virtualized network device to a secondary virtualized network device as a result of having detected that the primary virtualized network device is in the non-functional state.

18. The system as in claim 17, wherein the memory device includes instructions that, when executed by the at least one processor, causes the system to further failover to the secondary virtualized network device, the secondary virtualized network device having network state information that is synchronized with the primary virtualized network device.

19. The system as in claim 17, wherein the memory device includes instructions that, when executed by the at least one processor, causes the system to further analyze network packets transmitted to the primary virtualized network device and network packets transmitted from the primary virtualized network device to collect the historical data used to generate the statistical model.

\* \* \* \* \*